US007108245B2

(12) United States Patent
Lin

(10) Patent No.: US 7,108,245 B2
(45) Date of Patent: Sep. 19, 2006

(54) JACK HAVING SAFETY EFFECT

(75) Inventor: Lai-Shun Lin, Chia-Yi Hsien (TW)

(73) Assignee: Kai Hsiang Enterprise Co., Ltd., Chia-Yi Hsien (TW)

( * ) Notice: Subject to any disclaimer, the term of this patent is extended or adjusted under 35 U.S.C. 154(b) by 0 days.

(21) Appl. No.: 11/035,852

(22) Filed: Jan. 14, 2005

(65) Prior Publication Data

US 2006/0157678 A1 Jul. 20, 2006

(51) Int. Cl.
*B60P 1/48* (2006.01)

(52) U.S. Cl. ...................................................... 254/8 B

(58) Field of Classification Search ................ 254/8 B, 254/2 B, 124

See application file for complete search history.

(56) References Cited

U.S. PATENT DOCUMENTS 4,251,056 A * 2/1981 Maniglia .................... 254/8 B
4,289,299 A * 9/1981 Kameda ..................... 254/8 B

* cited by examiner

*Primary Examiner*—Robert C. Watson
(74) *Attorney, Agent, or Firm*—Alan D. Kamrath; Nikolai & Mersereau, P.A.

(57) ABSTRACT

A jack includes a base provided with a plurality of catch blocks, a lift arm pivotable relative to the base, and a safety member pivotally mounted on the lift arm to move therewith. Thus, when the lift arm is lifted, the first end of the safety member is locked on either one of the catch blocks of the base, so that the safety member is fixed by the base during upward movement of the lift arm so as to fix the lift arm, thereby preventing the lift arm from being lowered too quickly when the power supplied to the lift arm disappears accidentally due to malfunction so as to provide a safety effect.

11 Claims, 4 Drawing Sheets

JACK HAVING SAFETY EFFECT

BACKGROUND OF THE INVENTION

1. Field of the Invention

The present invention relates to a jack, and more particularly to a jack having a safety effect.

2. Description of the Related Art

A conventional jack in accordance with the prior art shown in FIG. 6 comprises a base 80 provided with a plurality of locking teeth 81, a lift arm 82 pivotally mounted on the base 80, and a locking rod 84 having a first end pivotally mounted on the lift arm 82 and a second end locked on the locking teeth 81 of the base 80 to prevent the lift arm 82 from being lowered down too rapidly when the power of the lift arm 82 disappears accidentally. However, the user needs to push the locking rod 84 to engage the respective locking teeth 81 of the base 80 when the lift arm 82 is lifted to a determined position, thereby causing inconvenience to the user when operating the jack, and thereby wasting the manual work. In addition, the locking rod 84 is not engaged with the respective locking teeth 81 of the base 80 exactly, so that the locking rod 84 is easily disengaged from the respective locking teeth 81 of the base 80, thereby causing danger to the user.

SUMMARY OF THE INVENTION

In accordance with the present invention, there is provided a jack, comprising a base provided with a plurality of catch blocks, a lift arm pivotable relative to the base, and a safety member pivotally mounted on the lift arm to move therewith and having a first end detachably locked on either one of the catch blocks of the base.

The primary objective of the present invention is to provide a jack having a safety effect.

Another objective of the present invention is to provide a jack, wherein when the lift arm is lifted, the first end of the safety member is stopped by and locked on either one of the catch blocks of the base, so that the safety member is fixed by the base during upward movement of the lift arm so as to fix the lift arm, thereby preventing the lift arm from being lowered too quickly when the power supplied to the lift arm disappears accidentally due to malfunction so as to provide a safety effect.

A further objective of the present invention is to provide a jack, wherein when the lift arm is lower to the minimum height, the ramp of the first end of the safety member is stopped by the pin, thereby unlocking the second end of the safety member from the locking hook of the lift arm, so that the first end of the safety member is pushed by the restoring force of the biasing member to move toward the catch blocks of the base and is normally locked on the catch blocks of the base.

A further objective of the present invention is to provide a jack that is provided with a plurality of support racks mounted on the support bracket to increase the height of the support bracket so as to increase the maximum height of the jack.

Further benefits and advantages of the present invention will become apparent after a careful reading of the detailed description with appropriate reference to the accompanying drawings.

DETAILED DESCRIPTION OF THE INVENTION

Figure 1:
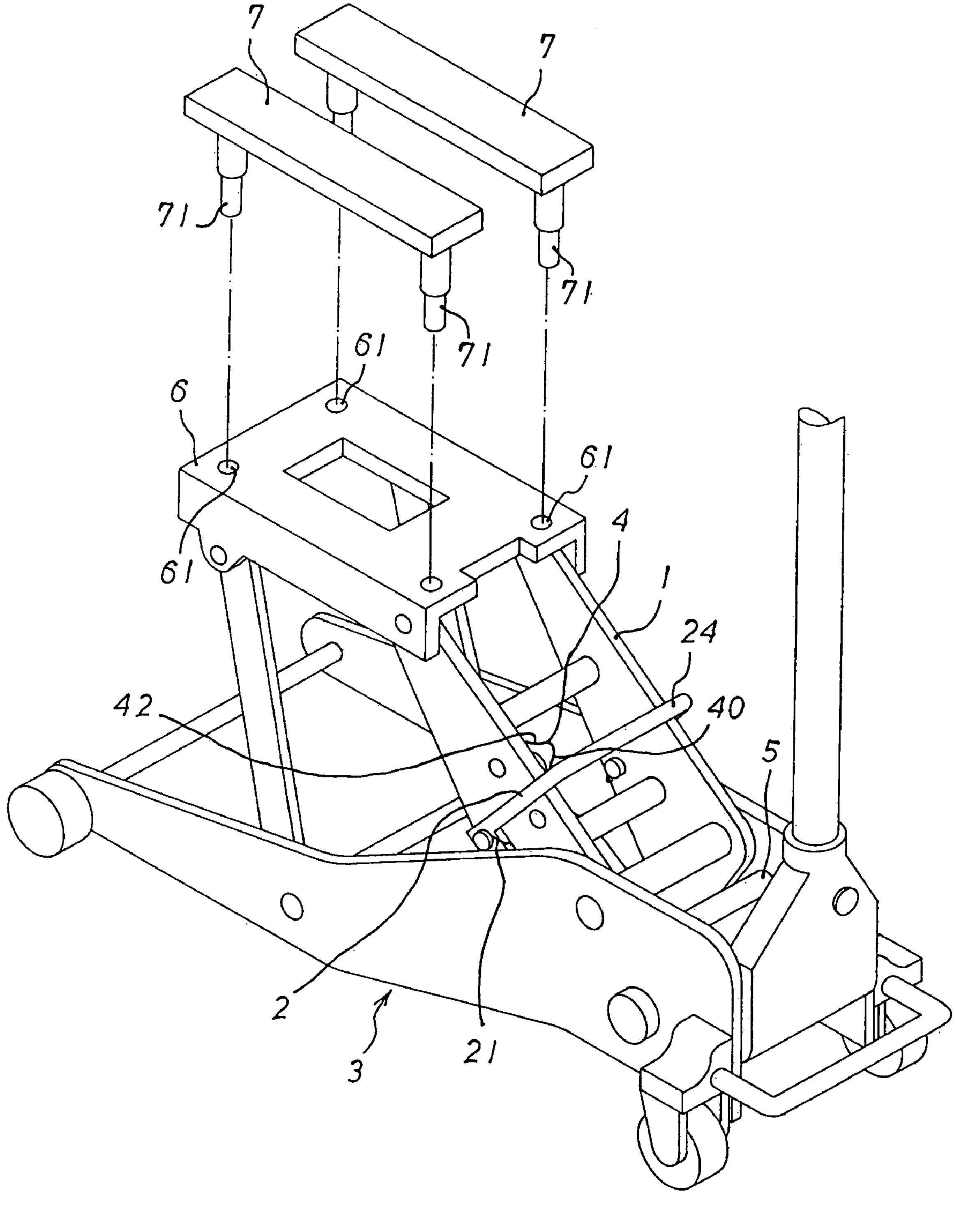
FIG. 1 is a partially exploded perspective view of a jack in accordance with the preferred embodiment of the present invention.
Figure 2:
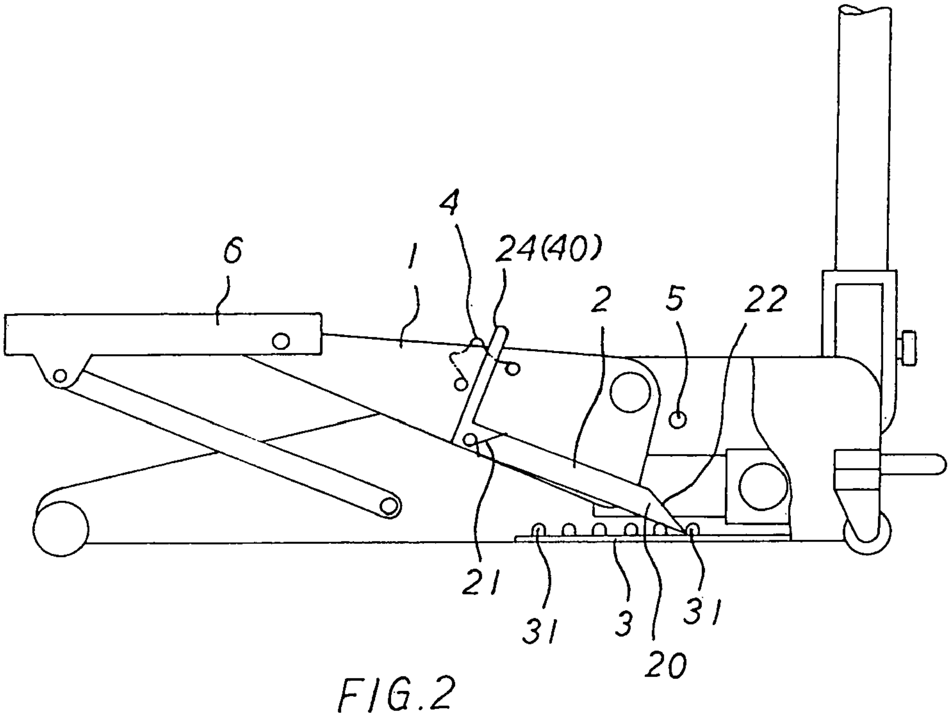
FIG. 2 is a partially side plan assembly view of the jack as shown in FIG. 1.

Referring to the drawings and initially to FIGS. 1 and 2, a jack in accordance with the preferred embodiment of the present invention comprises a base 3 provided with a plurality of catch blocks 31, a lift arm 1 pivotable relative to the base 3, a safety member 2 pivotally mounted on the lift arm 1 to move therewith and having a first end 20 detachably locked on either one of the catch blocks 31 of the base 3, and a biasing member 21 mounted on the safety member 2 to push the first end 20 of the safety member 2 to move toward the catch blocks 31 of the base 3.

The lift arm 1 has a first end pivotally mounted on the base 3. The lift arm 1 has a mediate portion provided with a locking hook 4. A pin 5 is mounted on the base 3 and located adjacent to the first end of the lift arm 1.

The safety member 2 is a substantially L-shaped frame. The first end 20 of the safety member 2 is formed with a ramp 22 that is movable to abut the pin 5. The safety member 2 has a second end 24 movably mounted on the lift arm 1 and detachably locked on the locking hook 4 of the lift arm 1.

The biasing member 21 is biased between the lift arm 1 and the first end 20 of the safety member 2 to push the first end 20 of the safety member 2 to move toward the catch blocks 31 of the base 3, so that the first end 20 of the safety member 2 is normally locked on the catch blocks 31 of the base 3.

Figure 3:
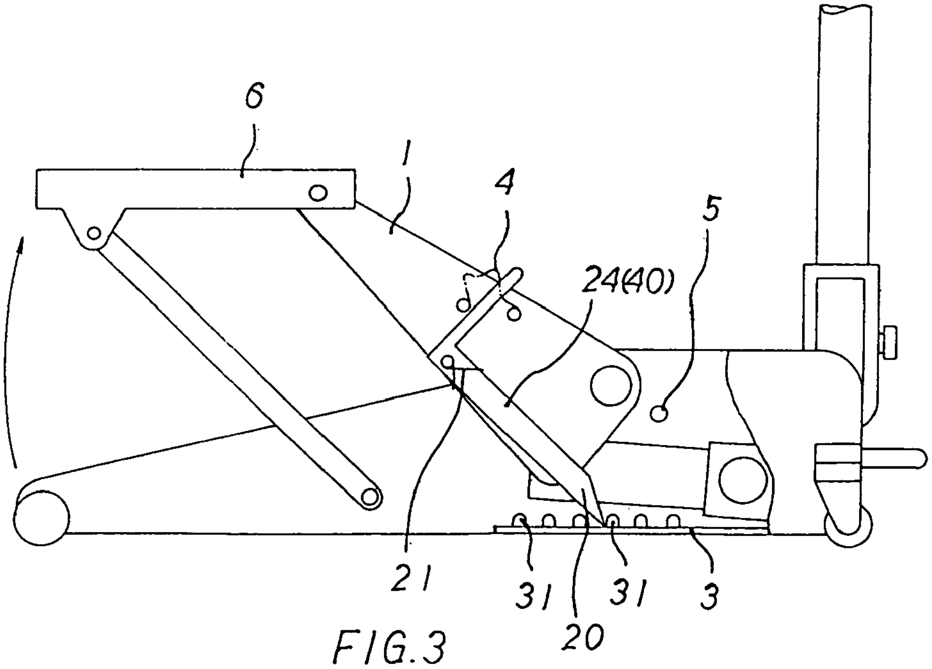
FIG. 3 is a schematic operational view of the jack as shown in FIG. 2.

In operation, as shown in FIGS. 1–3, when the lift arm 1 is moved upward relative to the base 3, the safety member 2 is moved upward with the lift arm 1, and the first end 20 of the safety member 2 is moved on the base 3 and locked on either one of the catch blocks 31 of the base 3. Thus, when the lift arm 1 is lifted from the position as shown in FIG. 2 to the position as shown in FIG. 3, the first end 20 of the safety member 2 is stopped by and locked on either one of the catch blocks 31 of the base 3, so that the safety member 2 is fixed by the base 3 during upward movement of the lift arm 1 so as to fix the lift arm 1, thereby preventing the lift arm 1 from being lowered too quickly when the power supplied to the lift arm 1 disappears accidentally due to malfunction so as to provide a safety effect.

Figure 4:
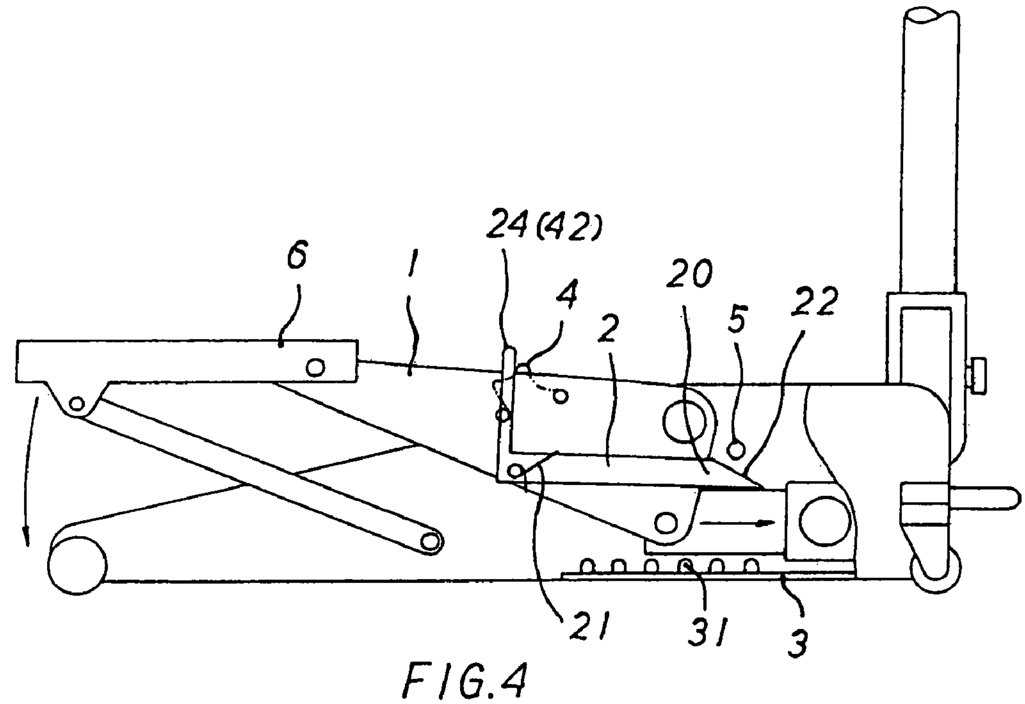
FIG. 4 is a schematic operational view of the jack as shown in FIG. 3.

As shown in FIGS. 3 and 4, when the user wishes to lower the lift arm 1, the safety member 2 is pivoted on the lift arm 1 to overcome the elastic force of the biasing member 21 so as move from the position as shown in FIG. 3 where the second end 24 of the safety member 2 is rested on a first side 40 of the locking hook 4 of the lift arm 1 to the position as shown in FIG. 4 where the second end 24 of the safety member 2 is locked on a second side 42 of the locking hook 4 of the lift arm 1, so that the first end 20 of the safety member 2 is detached from the catch blocks 31 of the base 3, and the lift arm 1 is released from the base 3 and is lowered slowly as shown in FIG. 4.

It is appreciated that, when the second end 24 of the safety member 2 is rested on the first side 40 of the locking hook 4 of the lift arm 1, the second end 24 of the safety member 2 is unlocked from the locking hook 4 of the lift arm 1, and the first end 20 of the safety member 2 is pushed by the biasing member 21 to move toward the catch blocks 31 of the base 3 and is normally locked on the catch blocks 31 of the base 3, and when the second end 24 of the safety member 2 is rested on the second side 42 of the locking hook 4 of the lift arm 1, the second end 24 of the safety member 2 is locked by the locking hook 4 of the lift arm 1, and the first end 20 of the safety member 2 is detached from the catch blocks 31 of the base 3.

Figure 5:
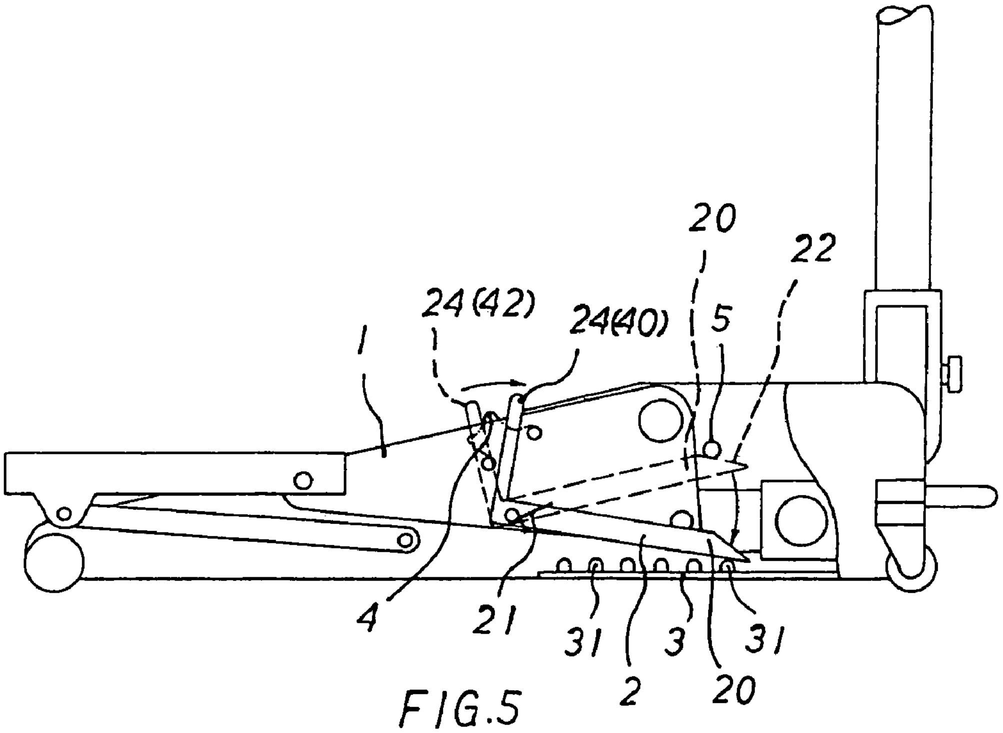
FIG. 5 is a schematic operational view of the jack as shown in FIG. 4.
Figure 6:
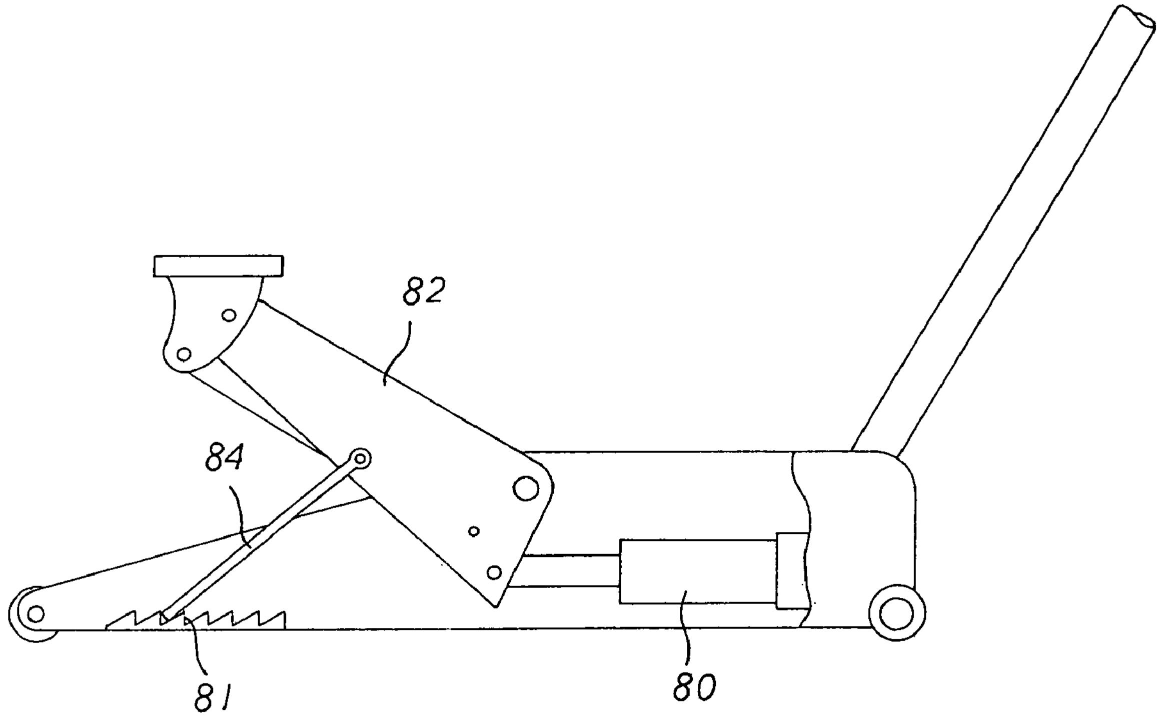
FIG.6 PRIOR ART
FIG. 6 is a side plan view of a conventional jack in accordance with the prior art.

As shown in FIGS. 4 and 5, when the ramp 22 of the first end 20 of the safety member 2 is moved with the lift arm 1 to abut the pin 5, the movement of the safety member 2 is stopped by the pin 5. At this time, the lift arm 1 is moved downward successively, so that the locking hook 4 of the lift arm 1 moved to pass through the second end 24 of the safety member 2. Thus, the second end 24 of the safety member 2 is moved from the second side 42 to the first side 40 of the locking hook 4 of the lift arm 1 as shown in FIG. 5, so that the first end 20 of the safety member 2 is pushed by the restoring force of the biasing member 21 to move toward the catch blocks 31 of the base 3, and is normally locked on the catch blocks 31 of the base 3.

As shown in FIG. 1, a support bracket 6 is pivotally mounted on a second end of the lift arm 1, and a plurality of support racks 7 are mounted on the support bracket 6 to increase the height of the support bracket 6. Preferably, the support bracket 6 is formed with a plurality of shaft holes 61, and each of the support racks 7 has two ends each formed with a shaft 71 inserted into a respective one of the shaft holes 61 of the support bracket 6.

Accordingly, when the lift arm 1 is lifted, the first end 20 of the safety member 2 is stopped by and locked on either one of the catch blocks 31 of the base 3, so that the safety member 2 is fixed by the base 3 during upward movement of the lift arm 1 so as to fix the lift arm 1, thereby preventing the lift arm 1 from being lowered too quickly when the power supplied to the lift arm 1 disappears accidentally due to malfunction so as to provide a safety effect. In addition, when the lift arm 1 is lower to the minimum height, the ramp 22 of the first end 20 of the safety member 2 is stopped by the pin 5, thereby unlocking the second end 24 of the safety member 2 from the locking hook 4 of the lift arm 1, so that the first end 20 of the safety member 2 is pushed by the restoring force of the biasing member 21 to move toward the catch blocks 31 of the base 3 and is normally locked on the catch blocks 31 of the base 3. Further, the jack is provided with a plurality of support racks 7 mounted on the support bracket 6 to increase the height of the support bracket 6 so as to increase the maximum height of the jack.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A jack, comprising:

a base provided with a plurality of catch blocks;

a lift arm pivotable relative to the base;

a safety member pivotally mounted on the lift arm to move therewith and having a first end detachably locked on either one of the catch blocks of the base;

a biasing member mounted on the safety member to push the first end of the safety member to move toward the catch blocks of the base;

wherein the biasing member is biased between the lift arm and the first end of the safety member to push the first end of the safety member to move toward the catch blocks of the base, so that the first end of the safety member is normally locked on the catch blocks of the base.

2. The jack in accordance with claim 1, wherein the safety member is a substantially L-shaped frame.

3. The jack in accordance with claim 1, further comprising a pin mounted on the base, and the first end of the safety member is formed with a ramp that is movable to abut the pin.

4. A jack comprising:

a base provided with a plurality of catch blocks;

a lift arm pivotable relative to the base;

a safety member pivotally mounted on the lift arm to move therewith and having a first end detachably locked on either one of the catch blocks of the base;

wherein the lift arm has a mediate portion provided with a locking hook, and the safety member has a second end movably mounted on the lift arm and detachably locked on the locking hook of the lift arm.

5. The jack in accordance with claim 4, wherein the safety member is pivoted on the lift arm to move to a position where the second end of the safety member is rested on a first side of the locking hook of the lift arm.

6. The jack in accordance with claim 5, wherein when the second end of the safety member is rested on the first side of the locking hook of the lift arm, the second end of the safety member is unlocked from the locking hook of the lift arm, and the first end of the safety member is pushed by the biasing member to move toward the catch blocks of the base and is normally locked on the catch blocks of the base.

7. The jack in accordance with claim 5, wherein the safety member is pivoted on the lift arm to move to a position where the second end of the safety member is locked on a second side of the locking hook of the lift arm, so that the first end of the safety member is detached from the catch blocks of the base.

8. The jack in accordance with claim 7, wherein when the second end of the safety member is rested on the second side of the locking hook of the lift arm, the second end of the safety member is locked by the locking hook of the lift arm, and the first end of the safety member is detached from the catch blocks of the base.

9. The jack in accordance with claim 1, wherein the lift arm has an end pivotally mounted on the base.

10. A jack, comprising:

a base provided with a plurality of catch blocks;

a lift arm pivotable relative to the base;

a safety member pivotally mounted on the lift arm to move therewith and having a first end detachably locked on either one of the catch blocks of the base;

a support bracket pivotally mounted on the lift arm, and a plurality of support racks mounted on the support bracket.

11. The jack in accordance with claim 10, wherein the support bracket is formed with a plurality of shaft holes, and each of the support racks has two ends each formed with a shaft inserted into a respective one of the shaft holes of the support bracket.

* * * * *